United States Patent [19]

Ono et al.

[11] Patent Number: 5,407,148

[45] Date of Patent: Apr. 18, 1995

[54] SEAT BELT TIGHTENING DEVICE

[75] Inventors: Katsuyasu Ono; Haruyuki Ikesue; Ryohei Yamauchi, all of Kanagawa, Japan

[73] Assignee: NSK Ltd., Tokyo, Japan

[21] Appl. No.: 78,644

[22] Filed: Jun. 21, 1993

[30] Foreign Application Priority Data

Jun. 19, 1992 [JP] Japan .............................. 4-048739 U
Jun. 29, 1992 [JP] Japan .............................. 4-050840 U

[51] Int. Cl.⁶ ............................................ B60R 22/46
[52] U.S. Cl. ................................................. 242/374
[58] Field of Search ......... 242/107, 107.4 A, 107.4 B, 242/107.4 R, 374; 280/806, 805, 803, 808, 807; 297/474–480

[56] References Cited

U.S. PATENT DOCUMENTS

| | | | |
|---|---|---|---|
| 4,447,017 | 5/1984 | Inukai | 242/107 |
| 4,508,287 | 4/1985 | Nilsson | 242/107 |
| 5,145,209 | 9/1992 | Lenzen | 280/806 |

FOREIGN PATENT DOCUMENTS

| | | |
|---|---|---|
| 1450901 | 10/1973 | United Kingdom . |
| 1441385 | 2/1974 | United Kingdom . |
| 2228183 | 2/1990 | United Kingdom . |
| 2244203 | 4/1991 | United Kingdom . |
| 9011913 | 10/1990 | WIPO . |

*Primary Examiner*—John M. Jillions
*Attorney, Agent, or Firm*—Sughrue, Mion, Zinn, Macpeak & Seas

[57] ABSTRACT

An object of the present invention is to provide a seat belt tightening device including a driving unit having excellent properties which assures that an intensity of webbing tightening power and a quantity of webbing tightening activity can easily be increased, and moreover, acceptable webbing tightening properties can be obtained with the seal belt tightening device. A driving unit 4 for a pretensioner disposed on one side wall of a retractor base 18 includes a pair of gas generators 8 and 9 which are arranged on the base end side of a cylinder 5. At the time of vehicle collision, a piston 6 slidably received in the cylinder 5 is driven by the explosion pressure derived from explosion of an explosive filled in both the gas generators 8 and 9, whereby a webbing winding shaft is rotated in such a direction that the loosened state of a seat belt can be eliminated.

8 Claims, 8 Drawing Sheets

SEAT BELT TIGHTENING DEVICE

BACKGROUND OF THE INVENTION

The present invention relates generally to a seat belt tightening device (serving as a pretensioner) for eliminating the loosened state of a webbing which arises at the time of vehicle collision, and also to a seat belt apparatus having the same. More particularly, the present invention relates to improvement of a seat belt tightening device of the foregoing type including a driving unit wherein a piston displaceably received in a cylinder is driven by gas pressure with the aid of the driving unit so as to allow a certain intensity of tension to be applied to the webbing, and also to a seat belt apparatus having the same.

With a conventional seat belt apparatus operable for assuring safety of passengers sitting on a seat in a vehicle, since there is a tendency that an intensity of winding power given by a retractor is reduced for the purpose of attenuating uncomfortablity felt by each passenger when he puts on a webbing around his body, an extent of loosening of a seat belt caused when he puts on it about his body is unavoidably increased, resulting in effective and safe restricting of each passenger failing to be achieved due to the delayed tightening of the seat belt extending about his body.

In view of the foregoing malfunction of the conventional seat belt apparatus, a proposal has been made with respect to a seat belt tightening device incorporated in a seat belt apparatus wherein the seat belt tightening device is instantaneously retracted together with a buckle to assume the operative state by quickly pulling a webbing at the time of an occurrence of emergency such as vehicle collision or the like so as to allow the webbing to be tightened in order to eliminate the loosened state of the seat belt.

To facilitate understanding of the present invention, a typical conventional retractor having a pretensioner attached thereto will briefly be described below with reference to FIG. 9.

Figure 9:
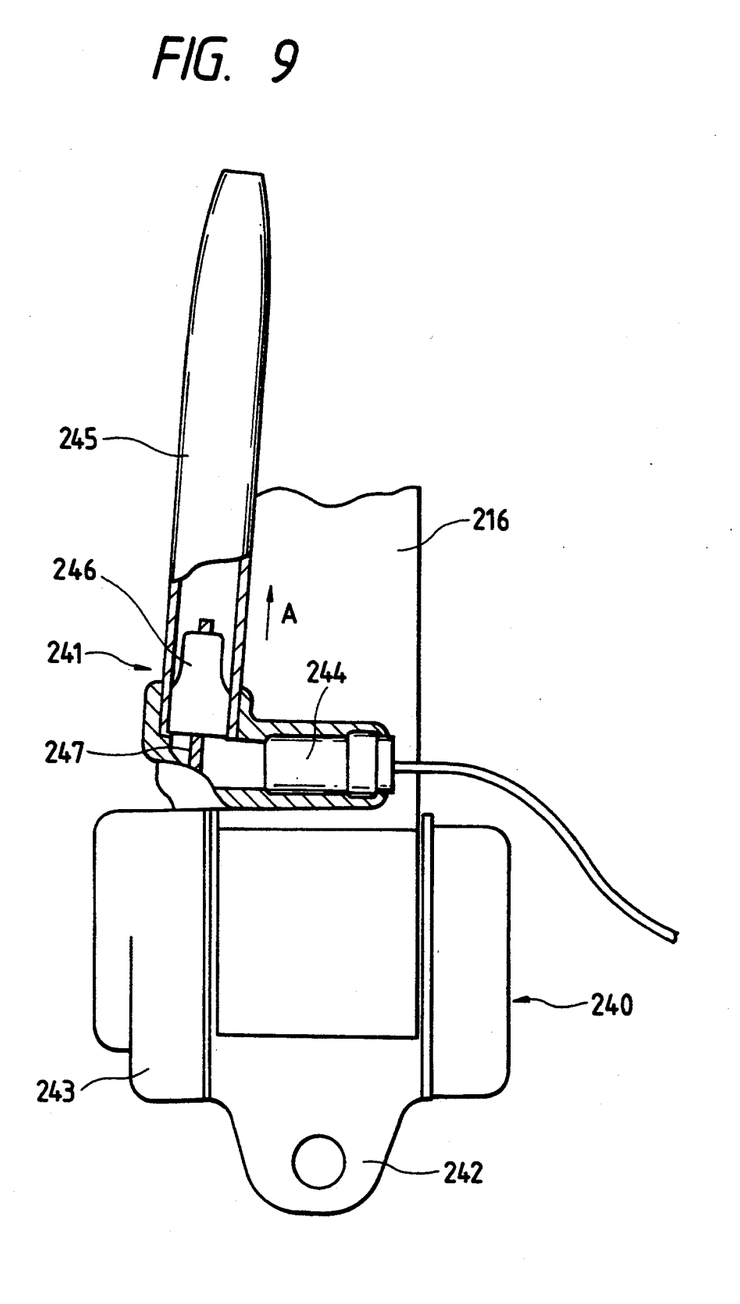
FIG. 9 is a partially exploded front view of a conventional retractor including a pretensioner, particularly showing essential components constituting the retractor.

A retractor 240 shown in FIG. 9 includes a winding reel having a webbing 216 wound thereabout in the laminated structure in such a manner as to enable it to be quickly wound and unwound, and a pretensioner 243 serving as a seat belt tightening device for rotating a winding shaft for the webbing 216 in such a direction that the loosened state of a seat belt can be eliminated is arranged on one side wall of a retractor base 242 of the retractor 240 having a substantially U-shaped sectional contour. The pretensioner 243 serves to apply a certain intensity of tension to a wire 247 wound about a pulley (not shown) mounted on the winding shaft at one end of the latter wherein the wire 247 is used as a power transmission member. With this construction, the wire 247 is retractively driven at the time of an occurrence of emergency such as vehicle collision or the like in such a direction that the winding shaft is rotated in the webbing winding direction, whereby the webbing 216 extending about a passenger's body is quickly retracted in the retractor 240. To this end, the retractor 240 includes a driving unit 241 for applying a certain intensity of tension to the wire 247.

The driving unit 241 is composed of a piston 246 connected to one end of the wire 247, a cylinder 245 in which the piston 246 is slidably received, and a gas generator 244 connectably communicated with the cylinder 245. An ignition heater and an explosive are received in the gas generator 244. In response to a detection signal outputted from a collision sensor, the ignition heater is turned on to generate heat, causing the explosive to be exploded to generate gas. When the piston 246 is slidably driven in the cylinder 245 in the upward direction by the expansion pressure of the gas generated in the gas generator 244, the winding shaft is driven in the webbing winding direction so that the webbing 216 extending about the passenger's body is quickly retracted in the retractor 240, resulting in the loosened state of the seat belt being eliminated.

In addition to the aforementioned pretensioner, a mechanical type pretensioner is also put in practical use to serve in such a manner as to eliminate the loosened state of a seat belt by instantaneously retracting a buckle in the webbing stretching direction. This mechanical type pretensioner includes a weight adapted to move in response to an acceleration induced by shock and a trigger unit for releasing a compression spring from the preliminarily compressed state in operative association with the weight. With the mechanical type pretensioner constructed in that way, a webbing extending about a passenger's body is retracted in a driving unit by transmitting the restorative resilient power of the compression spring directly or indirectly to a buckle.

To raise up safety of each passenger with the conventional seat belt apparatus at the time of an occurrence of vehicle collision, it is necessary that the passenger is intensely restricted on his seat by intensifying the webbing tightening force of the pretensioner and increasing a quantity of webbing tightening activity. However, since the pretensioner utilizes the explosion power of the explosive and the resilient power of the compression spring as a driving power for the pretensioner, it is practically difficult to intensify the webbing tightening power and a quantity of webbing tightening activity with the pretensioner.

In case that the gas generator is used for the pretensioner as a driving power source for the webbing tightening activity, a quantity of explosive should be increased in order to intensify the webbing tightening power but the increasing of the quantity of explosive is strictly limited from the viewpoint of safe treatment of the explosive and safety of the pretensioner. To increase a quantity of explosive and intensify the gas pressure of the explosive, it is necessary that a container is disposed in the pretensioner for receiving the gas generator in the container with a sufficiently high strength against the pressure of the gas generated by explosion of an explosive. In this connection, a problem is that a production cost of the pretensioner is raised up due to the necessity for reinforcing other components rather than the container.

In case that the resilient power of the compression spring is utilized as a driving power for the pretensioner, to intensify the webbing tightening power, it is necessary that the compression spring is designed with large dimensions and a spring constant of the compression spring is increased. This leads to the result that other components such as a weight, a trigger unit or the like should additionally be reinforced with certain additional means. Thus, there arises a problem that a production cost of the pretensioner is undesirably raised up.

In addition, to assure that the webbing is more intensely tightened, it is generally required that the pressure of gas in the cylinder is elevated in the rear half of tightening time when the tension applied to the webbing in increased, in order to intensify the webbing tightening power for the seat belt tightening device. With the aforementioned driving unit having the explosion power of an explosive utilized therefor, however, it is practically difficult to properly control an intensity of webbing tightening power and a driving time of the webbing, because the gas pressure is quickly increased immediately after the explosive is exploded, and thereafter, it is gradually decreased. For this reason, it is difficult to obtain adequate webbing tightening properties with the seat belt tightening device, and moreover, it is difficult that the seat belt tightening device exhibits excellent passenger restriction performances. Similarly, with the aforementioned driving unit having the explosion power of the elastic force of the spring, it is practically difficult to properly control an intensity of webbing tightening power and a driving time of the webbing, because the elastic force of the spring is the highest at a setting position, and thereafter, it is gradually decreased.

The present invention has been made in consideration of the aforementioned background and its object resides in providing a seat belt apparatus including a plurality of inexpensive pretensioners wherein the seat belt apparatus makes it possible to easily increase an intensity of webbing tightening power and a quantity of webbing tightening activity, and moreover, it assures adequate webbing tightening performances wherein each passenger sitting on a seat in a vehicle can firmly be restricted with high safety.

SUMMARY OF THE INVENTION

To accomplish the above object, the present invention provides a seat belt tightening device wherein a piston displaceably received in a cylinder is driven at the time of an occurrence of emergency, causing a high intensity of tension to be applied to a power transmission member connected to the piston so as to enable the loosened state of a seat belt to be eliminated by stretching a webbing with the power given by the power transmission member, wherein the seat belt tightening device is characterized in that a plurality of gas generators each adapted to drive the piston by the explosion pressure generated by explosion of an explosive filled in each of the gas generators are arranged on the base end side of the cylinder so that the piston is driven by the expansion pressure of gas generated in each of the gas generators.

According to one aspect of the present invention, there is provided a seat belt apparatus wherein one end of a webbing is connected to a retractor, the other end of the webbing is connected to a vehicle body at the lower end position of the latter via a through-anchor, and a through tongue disposed at the intermediate portion of the webbing between an anchor plate and the through-anchor is connected to a buckle standing upright from the substantially central part of the vehicle body so as to allow each passenger to be reliably restricted on a seat in a vehicle, wherein the seat belt apparatus is characterized in that a plurality of pretensioners each including a driving unit are arranged for the seat belt apparatus, the driving unit serving to eliminate the loosened state of a seat belt by retractively driving the webbing at the time of an occurrence of emergency such as vehicle collision or the like.

In addition, according to other aspect of the present invention, there is provided a seat belt apparatus of the foregoing type, wherein the seat belt apparatus is characterized in that a plurality of pretensioners are arranged for the seat belt apparatus, each of the pretensioners being adapted to operate in such a manner that a winding shaft for the retractor is rotated by driving a wire of which one end is connected to the winding shaft and of which end is operatably pulled at the time of an occurrence of emergency such as vehicle collision or the like, the winding shaft being rotated in such a direction that the loosened state of the seat belt can be eliminated.

The seat belt tightening device constructed according to the present invention assures that the driving power for winding the seat belt can be intensified by elevating the explosion pressure of an explosive exerted on the piston without any necessity for increasing a quantity of explosive filled in each gas generator. In addition, the seat belt tightening device makes it possible to control an intensity of webbing tightening power and a duration time of the webbing tightening power by properly controlling the time when each gas generator is ignited.

With the seat belt apparatus constructed according to the present invention, an intensity of webbing tightening power can be increased by simultaneously actuating a plurality of pretensioners without any necessity for intensifying the driving power generated by a driving unit for each pretensioner. In addition, the seat belt apparatus makes it possible to properly control an intensity of webbing tightening power and a duration time of the tightened state by adequately controlling the time of actuation of each of the pretensioners.

DETAILED DESCRIPTION OF THE PREFERRED EMBODIMENTS

The present invention will now be described in detail hereinafter with reference to the accompanying drawings which illustrate preferred embodiments thereof. A first embodiment according to the present invention will now be described in detail with reference to FIGS. 1 and 2.

Figure 1:
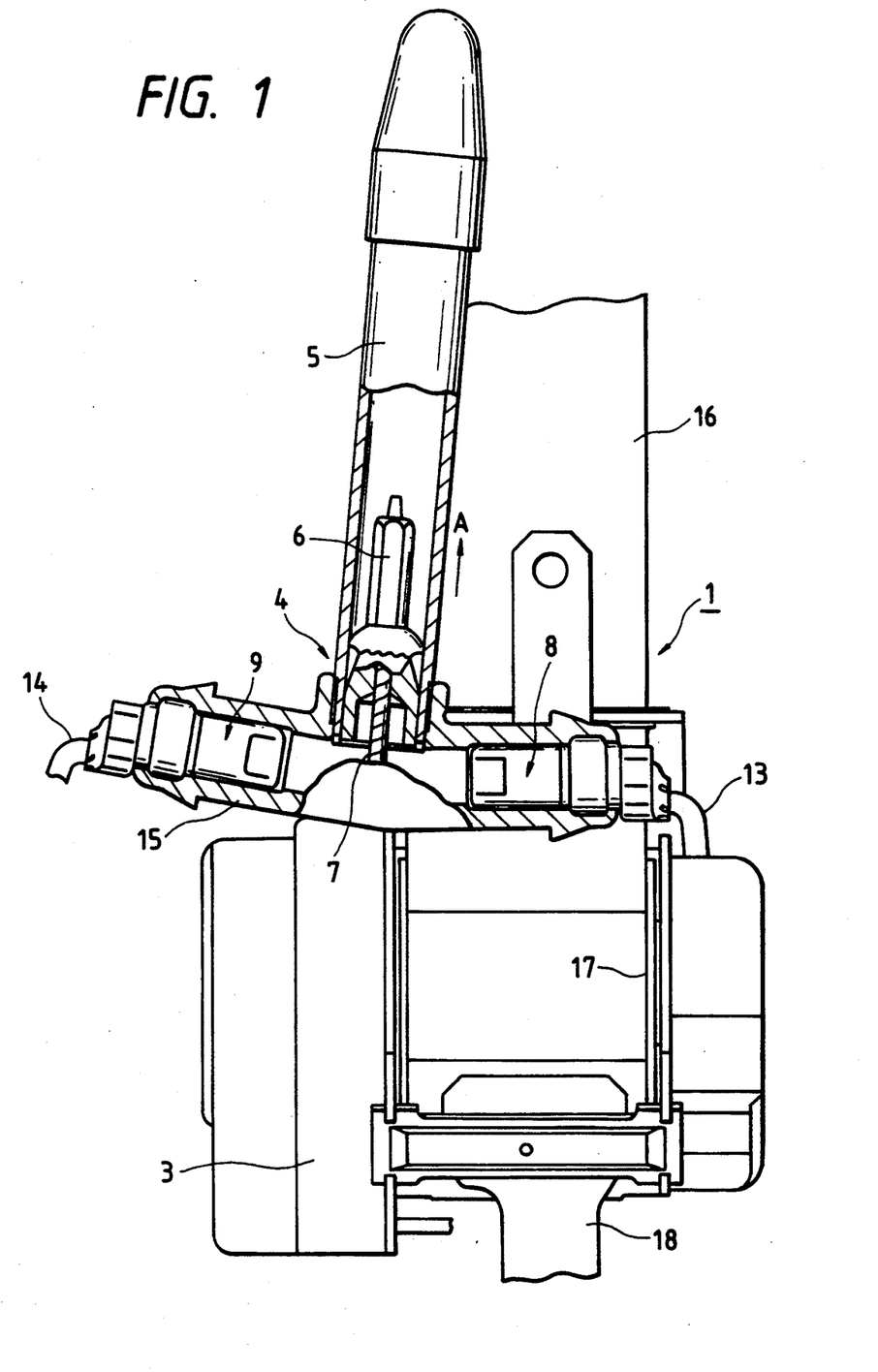
FIG. 1 is a partially exploded front view of a retractor including a pretensioner constructed according to a first embodiment of the present invention, particularly showing essential components constituting the retractor.

FIG. 1 is a partially exploded front view of a retractor including a pretensioner constructed according to a first embodiment of the present invention. A retructor having a pretensioner designated by reference numeral 1 includes a winding reel 17 having a webbing 16 wound thereabout in the laminated structure in such a manner as to freely wind and unwind the webbing 16, and a pretensioner 3 serving as a seat belt tightening device for rotating a winding shaft in such a direction that the loosened state of a seat belt can be eliminated is arranged on one side wall of a retractor base 18 having a substantially U-shaped sectional contour. The pretensioner 3 serves to apply a certain intensity of tension to a wire 7 wound about a pulley (not shown) mounted on a winding shaft at one end of the latter to serve as a gas power transmission member, allowing the winding shaft to be rotated in the webbing winding direction. With this construction, the wire 7 is quickly pulled upwardly at the time of an occurrence of emergency so as to forcibly rotate the pulley integrally mounted on the winding shaft in a webbing winding direction, whereby the webbing 16 extending about a passenger's body is quickly retracted in the retractor 1. In addition, the pretensioner 3 includes a driving unit 4 for applying a certain intensity of tension to the wire 7. (One example of the connecting structure between the wire and the winding shaft will be described in a fifth embodiment and shown in the FIGS. 5 and 6).

Figure 2:
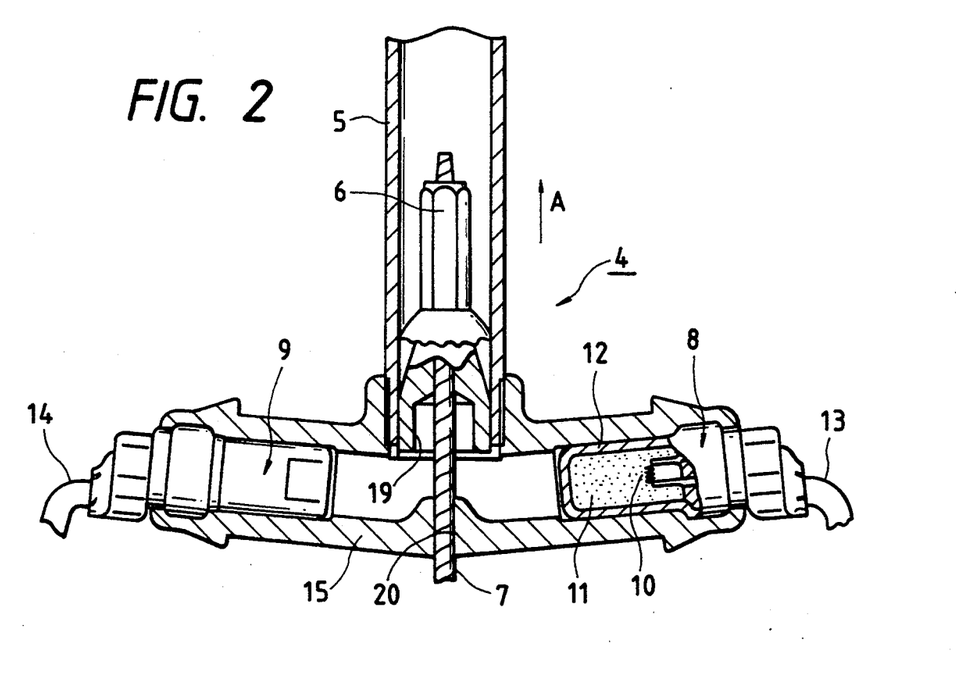
FIG. 2 is an enlarged sectional view of the pretensioner shown in FIG. 1, particularly showing essential components constituting the pretensioner.

As shown in FIG. 2, the driving unit 4 is composed of a piston 6 connected to one end of the wire 7, a cylinder 5 in which the piston 6 is slidably received, a substantially cylindrical housing 15, which extends in a direction perpendicular to the longitudinal direction of the cylinder 5, connectably communicated with the base end side of the cylinder 5 and a opposing pair of gas generators 8 and 9 arranged at opening portions on the opposite sides of the housing 5. An opening portion 19 is formed at the central part of the housing 15 as seen in the longitudinal direction of the latter, and the wire 7 is inserted through a hole 20 which is formed through the housing 15 at the position located opposite to the opening portion 19.

Both the gas generators 8 and 9 are constructed with a same structure in such a manner that an explosive 11 and a heat generating element 10 of an ignition heater are received in a case 12 of each gas generator sealably fitted into the housing 15. Signal lines 13 and 14 electrically connected to a control circuit (not shown) are connected to the gas generators 8 and 9 so that the ignition heater in the case 12 are independently turned on in response to a detection signal outputted from vehicle acceleration detecting means such as an acceleration sensor or the like adapted to detect an occurrence of emergency such as vehicle collision or the like. With this construction, it is possible to adequately control an ignition time when each of the gas generators 8 and 9 is ignited.

Next, a mode of operation of the retractor 1 including the pretensioner constructed in the aforementioned manner will be described below.

While a vehicle runs at a normal cruising speed, the pretensioner 3 is not brought in operative engagement with the winding shaft. Thus, the winding shaft can freely be rotated by the webbing 16. This makes it possible to wind the webbing 16 about the winding shaft by the resilient power of a winding spring (not shown), and moreover, unwind it against the resilient force of the winding spring.

When a certain magnitude of deceleration occurs with the vehicle due to quick braking or the like, an emergency locking mechanism (not shown) in the retractor is activated, resulting in the rotation of the winding shaft being prevented. Thus, the webbing 16 is not unwound from the winding shaft any more but since the collision sensor does not output any detection signal, the driving unit 4 for the pretensioner 3 is not actuated at all.

On the contrary, when a predetermined large magnitude of deceleration occurs with the vehicle at the time of vehicle collision or the like, the collision sensor detects this deceleration to output a detection signal therefrom. Subsequently, when explosives in both the gas generators 8 and 9 in the driving unit 4 are simultaneously exploded in response to the foregoing detection signal, the piston 6 slidably received in the cylinder 5 is quickly displaced in the upward direction (i.e., in the A arrow-marked direction in FIG. 2) by the expansion of combustion gas generated in both the gas generators 8 and 9. Thereafter, when the wire 7 is quickly pulled in the A arrow-marked direction by a predetermined magnitude of pulling power induced by the driving power of the piston 6, the winding shaft for the webbing 16 is rotated in the webbing winding direction with the result that the webbing 16 extending about a passenger's body is wound about the winding shaft until the loosened state of the seat belt is eliminated.

At this time, since the gas pressure of the combustion gas effective for driving the piston 6 assumes a value equal to the value derived from a combination of the pressure of the combustion gas generated in the gas generator 8 with the pressure of the combustion gas generated in the gas generator 9, the gas pressure required for driving the piston 6 can be increased without any necessity for increasing the gas pressure of the combustion gas generated in each of the gas generators 8 and 9 in excess of the gas pressure derived from the conventional gas generator. Consequently, there is no need of increasing a quantity of explosive to be filled in each of the gas generators 8 and 9, resulting in explosive handling performances and safety of each gas generator to be maintained during an assembling operation or the like being not deteriorated. In other words, the seat belt fastening device of the present invention assures that each passenger can more intensely and quickly be restricted on his seat in the vehicle with an increased intensity of webbing tightening power at an increased tightening speed while suppressing the deterioration of explosive handling performances and safety of each gas generator with the result that safety of each passenger at the time of vehicle collision can be improved with the seat belt fastening device.

The seat belt fastening device constructed according to the first embodiment of the present invention has been described above with respect to the case that both the gas generators 8 and 9 are simultaneously activated in response to an ignition signal. Alternatively, an ignition signal may be outputted to each of the gas generators 8 and 9 with a time difference therebetween so as to enable the time of applying the tightening power to the webbing 16 to be variably controlled with an increased degree of freedom for obtaining required webbing tightening properties with the seat belt tightening device.

In this modified case, first, the gas generator 8 is activated in response to a first ignition signal, and subsequently, the gas generator 9 is activated in response to a second ignition signal with predetermined time delay after the first ignition signal is transmitted to the gas generator 8. With such modification, combustion gas is generated in the gas generator 9 around at the time when the pressure of the combustion gas generated in the gas generator 8 starts to be reduced. Thus, the pressure of the combustion gas effective for driving the piston 6 can be endured for a predetermined period of tightening time, and moreover, the gas pressure in the cylinder 5 can be increased for the rear half of tightening time when the tension applied to the webbing 16 is increased, resulting in the webbing tightening power being intensified while maintaining excellent restricting performances of the seat belt tightening device.

Next, a driving unit for a seat belt tightening device constructed according to a second embodiment of the present invention will be described below with reference to FIG. 3.

Figure 3:
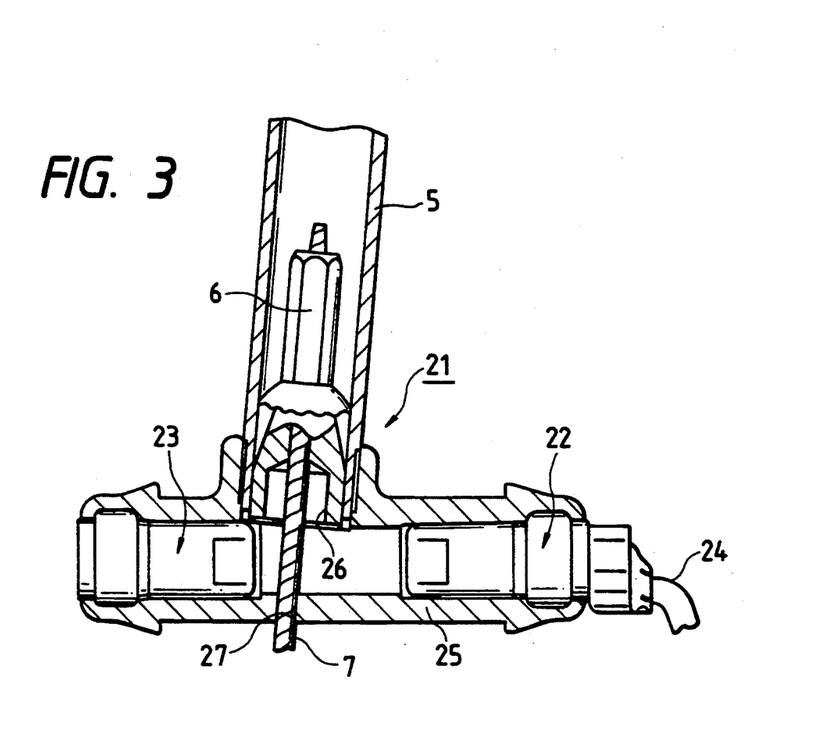
FIG. 3 is an enlarged sectional view of a pretensioner constructed according to a second embodiment of the present invention, particularly showing essential components constituting the pretensioner.

FIG. 3 is a sectional view of a driving unit 21 for the seat belt tightening device of the present invention. The driving unit 21 is composed of a piston 6 connected to one end of a wire 7, a cylinder 5 in which the piston 6 is slidably received, a substantially cylindrical housing 25 connectably communicated with the base end side of the cylinder 5 and an opposing pair of gas generators 22 and 23. The base end of the cylinder 5 is fixed to an opening portion 26 formed through the housing 25 at the position offset from the middle point of the housing 25, and the wire 7 is inserted through a hole 27 located opposite to the opening portion 26.

The gas generator 22 is constructed in the same manner as the generators 8 and 9 in the first embodiment and a signal line 24 electrically connected to a control circuit (not shown) is connected to the gas generator 22. In contrast with the gas generator 22, a signal line electrically connected to the control circuit is not connected to the gas generator 23. In this embodiment, after the gas generator 22 is ignited in response to a detection signal outputted from vehicle acceleration detecting means such as an acceleration sensor or the like adapted to detect vehicle collision or the like, the gas generator 23 is subsequently exploded by the function of shock and explosion pressure induced by the gas generator 22 with some time delay from the ignition time of the gas generator 22. Thus, the pressure of the combustion gas effective for driving the piston 6 can be endured for a predetermined period of tightening time, and moreover, the gas pressure in the cylinder 5 can be increased for the rear half of tightening time when the tension applied to the webbing 16 is increased, resulting in the webbing tightening power being intensified while maintaining excellent restricting performances of the seat belt tightening device.

In case that the driving unit 21 is modified in the above-described manner according to the second embodiment of the present invention, there is no need of disposing any special delaying unit for delaying the ignition time of the gas generator 23 from that of the gas generator 22. Consequently, the structure of the seat belt tightening device can be simplified while suppressing undesirable cost increase.

Next, a driving unit for a seat belt tightening device constructed according to a third embodiment of the present invention will be described below with reference to FIG. 4.

Figure 4:
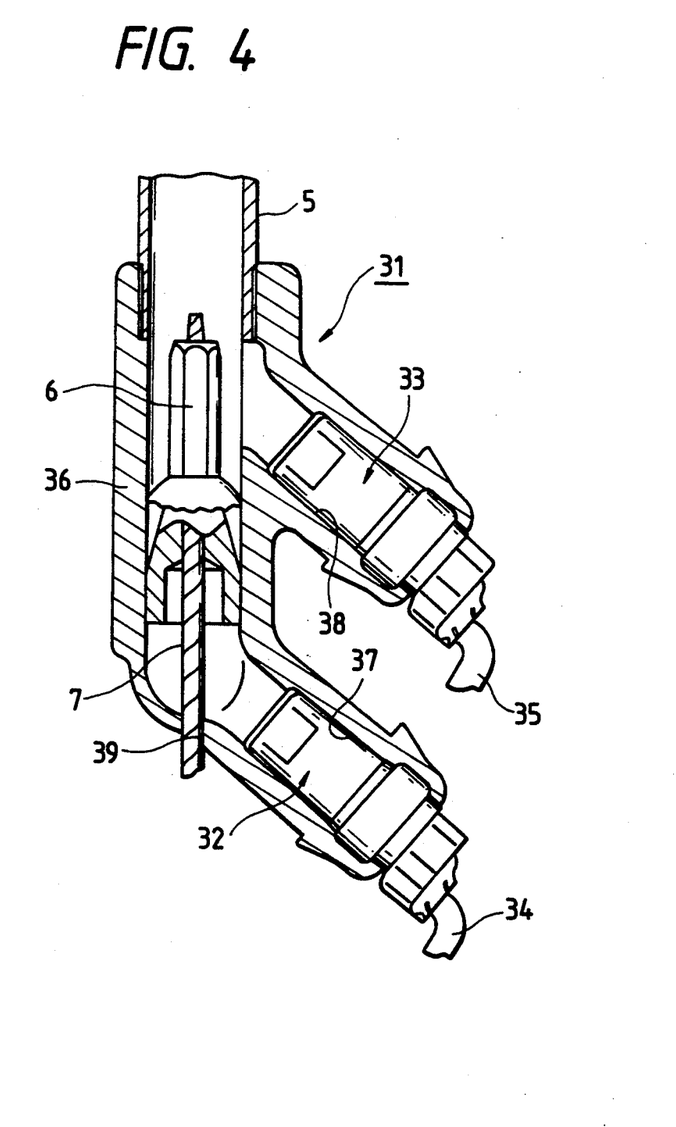
FIG. 4 is an enlarged sectional view of a pretensioner constructed according to a third embodiment of the present invention, particularly showing essential components constituting the pretensioner.

FIG. 4 is a sectional view of a driving unit 31 for the seat belt tightening device of a third embodiment according to the present invention. The driving unit 31 is composed of a piston 6 connected to one end of a wire 7, a cylinder 5 in which the piston 5 is slidably received, a substantially cylindrical housing 36 connectably communicated with the base end side of the cylinder 5 and a pair of gas generators 32 and 33 arranged in insert portions 37 and 38 of the housing 36.

The base end of the cylinder 5 is fixed to an upper opening portion of the housing 36, and the wire 7 is inserted through a hole 39 on the bottom of the housing 36 located opposite to the upper opening portion of the same. The insert portion 37 is communicated with an opening portion formed through the bottom of the housing 36, while the insert portion 38 is communicated with an opening portion formed through the side wall of the housing 36 at the position in the vicinity of the upper opening portion of the housing 36. As is apparent from the drawing, both the insert portions 37 and 38 are designed in the form of a pair of substantially cylindrical projections which are projected from the opening portions thereof in the slantwise downward direction (that is, which are inclined at a predetermined angle with respect to the longitudinal direction of the cylinder 5) while extending in parallel with each other, and the gas generators 32 and 33 are immovably received in the insert portions 37 and 38.

Both the gas generators 32 and 33 are designed with a same structure, and signal lines 34 and 35 electrically connected to a control circuit (not shown) are connected to the gas generators 32 and 33 so as to enable both the gas generators 32 and 33 to be independently ignited in response to detection signals outputted from vehicle acceleration detecting means such as an acceleration sensor or the like adapted to detect vehicle collision or the like. Thus, the ignition time of each of the gas generators 32 and 33 can adequately be controlled with the aid of the control circuit.

In this embodiment, first, the gas generator 32 is ignited, and subsequently, the gas generator 33 is ignited with predetermined time delay from the ignition time of the gas generator 32. Thus, combustion gas is generated in the gas generator 33 around at the time when the pressure of the combustion gas generated in the gas generator 32 starts to be reduced. Thus, the pressure of the combustion gas effective for driving the piston 6 can be endured for a predetermined period of tightening time, and moreover, the gas pressure in the cylinder 5 can be enlarged for the rear half of tightening time when the tension applied to the webbing 16 is increased, resulting in the webbing tightening power being intensified while maintaining excellent restricting performances of the seat belt tightening device.

In case that the driving unit 31 is modified in the above-described manner according to the third embodiment of the present invention, since both the gas generators 32 and 33 are arranged merely on the right-hand side of the cylinder 5 as seen in the drawing, they are not projected outside of the cylinder 5 on the opposite sides of the latter, whereby the pretensioner of the seat belt tightening device can be designed with small dimensions. Consequently, the retractor having the pretensioner attached thereto in the above described manner can easily be fitted to a vehicle body.

It should of course be understood that the present invention should not be limited only to the aforementioned three embodiments but various change or modification may be made without departure from the scope of the present invention as defined by the claim clause. The present invention has been described above with respect to the case that the seat belt tightening device constructed in the above-described manner is fitted to the retractor. Alternatively, the present invention may equally be applied to a seat belt tightening device including a buckle which is instantaneously retracted in the webbing winding direction, as described later. In addition, igniting means for both the gas generators should not be limited only to ignition signals outputted from the aforementioned electrical detecting means. Alternatively, igniting means having a substance of inertia employed therefor may be substituted for the foregoing electrical igniting means.

In addition, the structure of the retractor including a pretensioner should not be limited only to the aforementioned types. Alternatively, various other type may be employed in place of the aforementioned ones.

Figure 5:
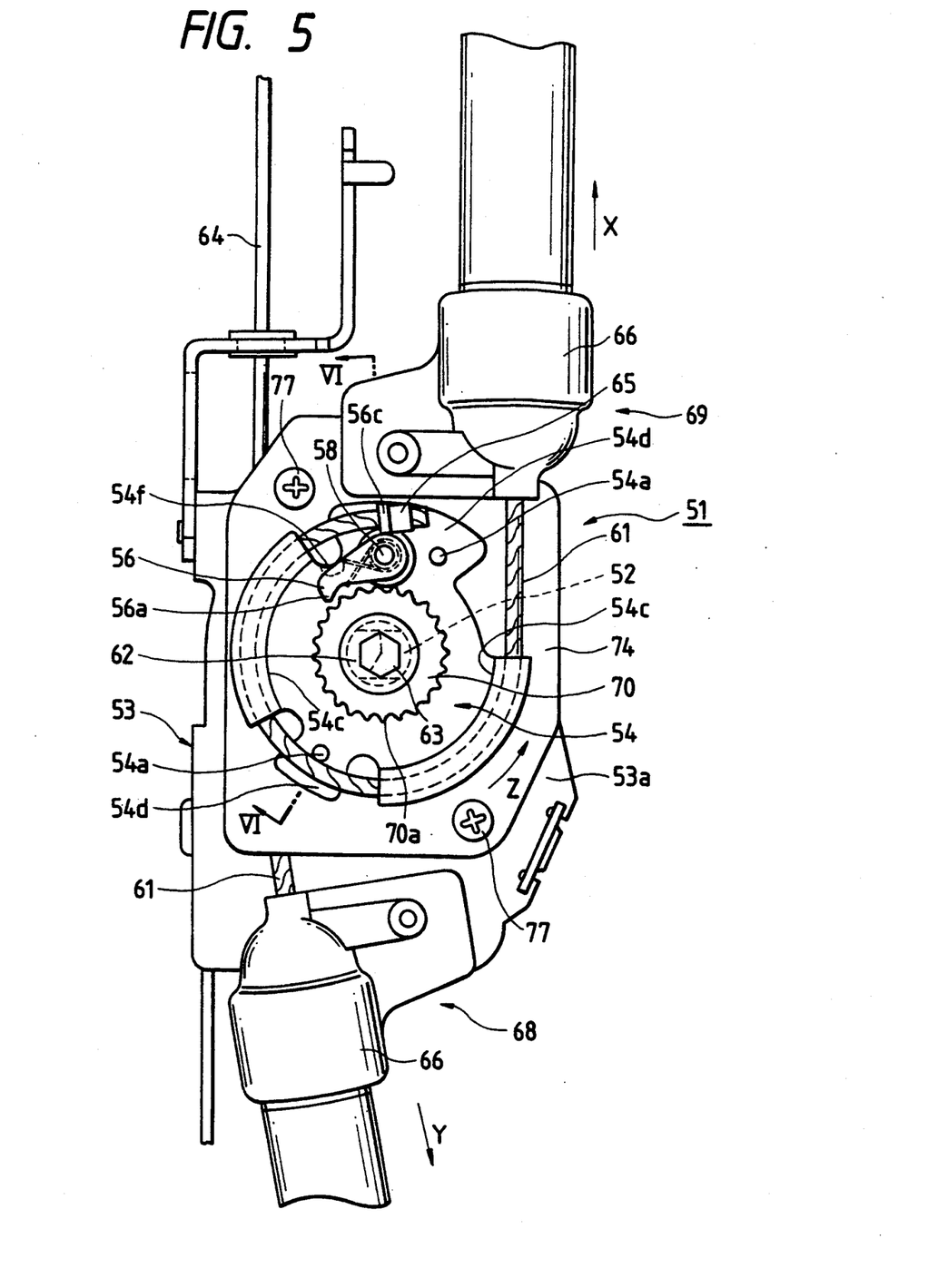
FIG. 5 is a partially exploded front view of a seat belt retractor constructed according to a fourth embodiment of the present invention wherein two pretensioner are attached to the seat belt retractor.
Figure 6:
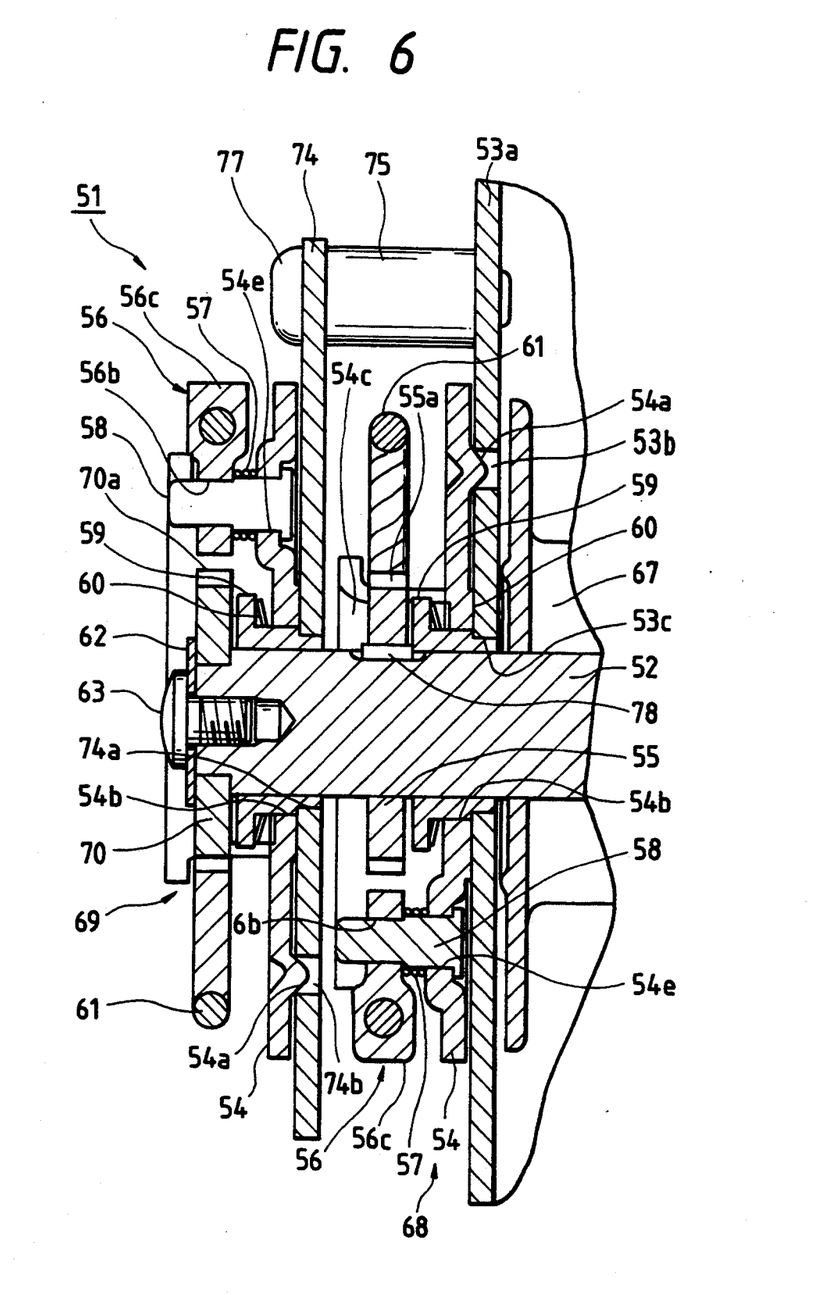
FIG. 6 is a fragmentary enlarged sectional view of the pretensioners taken along line VI—VI in FIG. 5.

FIG. 5 and FIG. 6 show a retractor 51 having two pretensioners attached thereto for a so-called three point type seat belt apparatus constructed according to the fourth embodiment of the present invention. The retractor 51 includes a winding reel 67 about which a webbing 64 is wound in the laminated structure, and the winding reel 67 is normally biased by the resilient power of a winding spring (not shown) connected to a winding shaft 52 for the winding reel 67 in such a direction that the webbing 64 is wound thereabout. At the time of an occurrence of emergency such as vehicle collision or the like, an emergency locking mechanism (not shown) is actuated so as not to allow the webbing 64 to be unwound at all by preventing the winding shaft 52 from being rotated further.

A first pretensioner 68 for rotating the winding shaft 52 in the direction of eliminating the loosened state of a seat belt is arranged on a left-hand side wall 53a of a retractor base 53 of the retractor 51 having a substantially U-shaped sectional contour, while a second pretensioner 69 having the substantially same structure as that of the first pretensioner 68 is arranged outside of a sub-frame 74 (i.e., leftward of the sub-frame 74 as seen in FIG. 6). Both the first pretensioner 68 and the second pretensioner 69 are covered with a common housing (not shown). The sub-frame 74 is fixedly secured to the side wall 53a of the retractor base 53 by tightening a plurality of set screws 77 while a plurality of spacers 75 each having a predetermined length is interposed between the side wall 53a of the retractor base 53 and the sub-frame 75.

The second pretensioner 69 arranged on the sub-frame 74 is composed of a plate 54 having a hole 54b formed so as to allow the left-hand end part of the winding shaft 52 to be inserted therethrough, a pawl wheel 70 fixedly mounted on the winding shaft 52, a pawl member 56 turnably supported on the plate 54 to turn about a support pin 58, a wire 61 wound about the plate 54 while one end of the wire 61 is connected to the pawl member 56, and a driving unit 66 connected to other end of the wire 61.

The hole 54b is formed through the plate 54 having a circular contour at the central part of the latter so as to allow the left-hand end part of the winding shaft 52 to inserted through the hole 54b. A pair of radially extending flange portions 54d are formed on the outer peripheral edge of the plate 54, while a pair of radially extending wire winding portions 54c are formed on the left-hand side of the plate 54 while projecting outside of the plate 54. A pair of conical engagement projections 54a adapted to be engaged with a pair of holes 74b are formed on the flange portions 54d, and a pin insert hole 54e is formed through one of the flange portions 54d so as to turnably support the pawl member 56 to turn about the support pin 58 therethrough.

The plate 54 is rotatably supported on a bush 59 press-fitted into a hole 74a formed through the sub-frame 74. Since the plate 54 is normally biased toward the sub-frame 74 by the resilient force of a cup washer 60 interposed between the bush 59 and the plate 54, the conical engagement projections 54a are brought in engagement with the holes 74b as the plate 54 is rotated. With this construction, the plate 54 is normally supported in such a manner as to prevent it from being rotated, but when a rotational power having an intensity in excess of a predetermined one is exerted on the plate 54, the conical engagement projections 54a are disengaged from the holes 74b against the resilient force of the cup washer 60. At this time, the plate 54 becomes rotatable.

A plurality of teeth 70a are formed around the outer periphery of the pawl wheel 70 which is fitted onto the left-hand end part of the winding shaft 52 while it is fixedly secured to the winding shaft 52 by tightening a bolt 63 with the aid of a washer 62, whereby the pawl wheel 70 is rotated together with the winding shaft 52.

The pawl member 56 includes an engagement portion 56a adapted to be engaged with each tooth 70a, a through hole 56b through which the support pin 58 is inserted while it is fixed to the plate 54 after it is inserted through the hole 56b, and a connecting portion 56c having one end of the wire 61 connected thereto, whereby the pawl member 56 is turnably supported on the plate 54 adjacent to the pawl wheel 70. In addition, the pawl member 56 is normally biased by the resilient force of a coil spring 57, of which one end is fixed to the pawl member 56 and of which other end is engaged with an engagement projection 54f, in such a rotational direction that the engagement portion 56a is disengaged from the pawl wheel 70.

One end of the wire 61 is connected to the connecting portion 56c of the pawl member 56 via a wire end 65. As is best seen in FIG. 5, the wire 61 is caused to extend in the upward direction after it is wound about the wire winding portion 54c by a predetermined number of turns. The other end of the wire 61, i.e, the uppermost end of the same is connected to a piston (not shown) of the driving unit 66.

The driving unit 66 is electrically connected to a collision sensor which serves to output a detection signal when a deceleration having a magnitude in excess of a predetermined one occurs after the time of an occurrence of vehicle collision. In response to the detection signal, a gas generator (not shown) disposed in the driving unit 66 generates gas of an explosive in a cylinder so as to slidably displace a piston in the cylinder by the gas pressure. As the piston is displaced in that way, the wire 61 is stretchably unwound in the upward direction (in the X arrow-marked direction as seen in FIG. 5).

The first pretensioner 68 is arranged on the side wall 53a of the retractor base 53 in such a manner that a pawl wheel 55 corresponding to the pawl wheel 70 in the second pretensioner 69 is rotated together with the winding shaft 52 through a key 78 which is fitted on the outer peripheral surface of the winding shaft 52. The first pretensioner 68 is designed in the same manner as the second pretensioner 69 with the exception that a hole 53b formed through the side wall 53a of the retractor base 53 is brought in engagement with a conical engagement projection 54a on the plate 54 as the latter is rotated. A driving unit 66 for the first pretensioner 68 is constructed such that a piston (not shown) slidably received in the driving unit 66 is displaced in the downward direction (i.e., in the Y arrow-marked direction as seen in FIG. 5) with an angular offset of 180 degrees relative to the driving unit 66 for the second pretensioner 69. Other components rather than the driving unit 66 are represented by same reference numerals as those of the second pretensioner 69. Thus, repeated description on these components will not be required.

With the retractor 51 constructed in the above-described manner, the driving units 66 for both the first and second pretensioners 68 and 69 can independently be actuated in response to a detection signal outputted from the collision sensor electrically connected to a control circuit (not shown) which serves to adequately control the actuation time of each of both the first and second pretensioners 68 and 69.

Next, a mode of operation of the retractor 51 constructed in the above-described manner will be described below.

While a vehicle runs at a normal cruising speed, the pawl members 56 on both the first and second pretensioners 68 and 69 are not engaged with the pawl wheels 55 and 70 so that the winding shaft 52 can freely be rotated. Thus, a webbing 64 can be wound about the winding shaft 52 by the resilient power of a winding spring. Otherwise, it can be unwound from the winding shaft 52 against the resilient power of the winding spring.

When a considerably large magnitude of deceleration occurs with the vehicle due to quick braking or the like, an emergency locking mechanism (not shown) in the retractor 51 is actuated to prevent the rotation of the winding shaft 52. At this time, since further unwinding of the webbing 14 from the winding shaft 52 is not permitted and the collision sensor does not output any collision signal therefrom, the driving units 66 of both the first and second pretensioners 68 and 69 are not actuated.

On the contrary, when a very large magnitude of deceleration occurs with the vehicle due to an occurrence of emergency such as vehicle collision or the like, the collision sensor detects this deceleration and outputs a detection signal which in turn is simultaneously transmitted to both the first and second pretensioners 68 and 69 as an ignition signal, causing explosion gas to be filled in the cylinders of both the driving units 66, whereby the piston in the cylinder of the driving unit 66 in the second pretensioner 69 is displaced in the upward direction (i.e., in the X arrow-marked direction as seen in FIG. 5), while the piston in the cylinder of the driving unit 66 in the first pretensioner 68 is displaced in the downward direction (i.e., in the Y arrow-marked direction as seen in FIG. 5). Consequently, the wire 61 of the second pretensioner 69 is quickly pulled with a predetermined intensity of pulling power in the X arrow-marked direction, while the wire 61 of the first pretensioner 68 is quickly pulled with a predetermined intensity of pulling power in the Y arrow-marked direction.

At this time, since the plates 54 of both the first and second pretensioners 68 and 69 are held in the immovable state without any rotation thereof, the pulling power of the wires 61 applied to the pawl members 56 via the connecting portions 56c turnably drives the pawl members 56 against the resilient power of the coil springs 57 in the counterclockwise direction as seen in FIG. 5, whereby the engagement portions 56a of the pawl members 56 are brought in meshing engagement with a tooth 55a on the pawl wheel 55 and a tooth 70a on the pawl wheel 70. Since the wires 61 for turnably driving the pawl members 56 are connected directly to the pawl members 56, the meshing engagement of the engagement portions 56a with the pawls 55a and 70a is reliably achieved with both the first and second pretensioners 68 and 69.

As the wires 61 are pulled further, the rotational power having an intensity in excess of a predetermined one is exerted on the plates 54 via the support pin 58, resulting in the engagement projections 54a on the plates 54 being disengaged from the holes 53b and 74b against the resilient force of the cup springs 60. Thus, the plates 54 are rotated in the Z arrow-marked direction as seen in FIG. 5. At this time, since the pawl members 56 are still engaged with the pawl wheels 55 and 70, both the pawl wheels 55 and 70 are rotated together with the plates 54 by the driving power given by the wires 61 in the Z arrow-marked direction.

As a result, since the winding shaft 52 is rotated in the direction of winding the webbing 64 about the winding reel 67, the webbing 64 is tightened so as to enable the loosened state of the webbing 64 to be eliminated.

Specifically, since the winding power effective for winding the webbing 64 in that way is intensified by simultaneously rotating the winding shaft 52 by the driving units 66 of both the first and second pretensioners 68 and 69, there is no need of increasing an intensity of driving power generated by each driving unit 66 much more than that of the conventional seat belt apparatus. Consequently, there is no need of increasing a quantity of explosive required for activating each driving unit 66, there is no need of fitting a container to the seat belt apparatus for receiving a gas generator therein with a sufficiently high strength enough to stand against a higher pressure than that of the conventional seat belt apparatus, and moreover, there is no need of reinforcing other components rather than the container with certain additional means. Thus, each passenger can intensely be restricted on his seat in the vehicle with an increased intensity of webbing tightening power while suppressing any increase of a production cost of the seat belt apparatus, resulting in safety of each passenger at the time of an occurrence of vehicle collision being improved.

The present invention has been described above with respect to the case that both the first and second pretensioners 68 and 69 are simultaneously actuated in response to an ignition signal outputted from the collision sensor. Otherwise, the present invention may be modified in such a manner that the webbing tightening time is controlled by activating both the first and second pretensioners 68 and 69 in response to ignition signals outputted from the collision sensor with a certain time difference therebetween.

In this modified embodiment, it is possible to stepwise control an intensity of webbing tightening power by actuating the first pretensioner 68 by detection of a primary collision, and subsequently, actuating the second pretensioner 69 by detection of a secondary vehicle collision. In addition, it is possible to increase a quantity of webbing tightening activity by actuating the second pretensioner 69 after completion of actuation of the first pretensioner 68. In this case, since the pawl member 56 of the first pretensioner 68 is disengaged from the corresponding pawl wheel 55 when the winding shaft 52 is rotationally driven by the second pretensioner 69 after completion of the winding operation with the first pretensioner 68, there does not arise a malfunction that rotational driving of the winding shaft 52 to be achieved by the second pretensioner 69 is obstructed by the first pretensioner 68.

Since both the pretensioners can independently be actuated in the above-described manner in addition to the case that they are simultaneously actuated, according to the present invention, the webbing tightening properties of the seat belt apparatus can adequately be controlled.

In the aforementioned embodiment, pretensioners each having a same structure are used for constructing the seat belt apparatus. Alternatively, pretensioners each having a different structure may be combined with each other.

Figure 7:
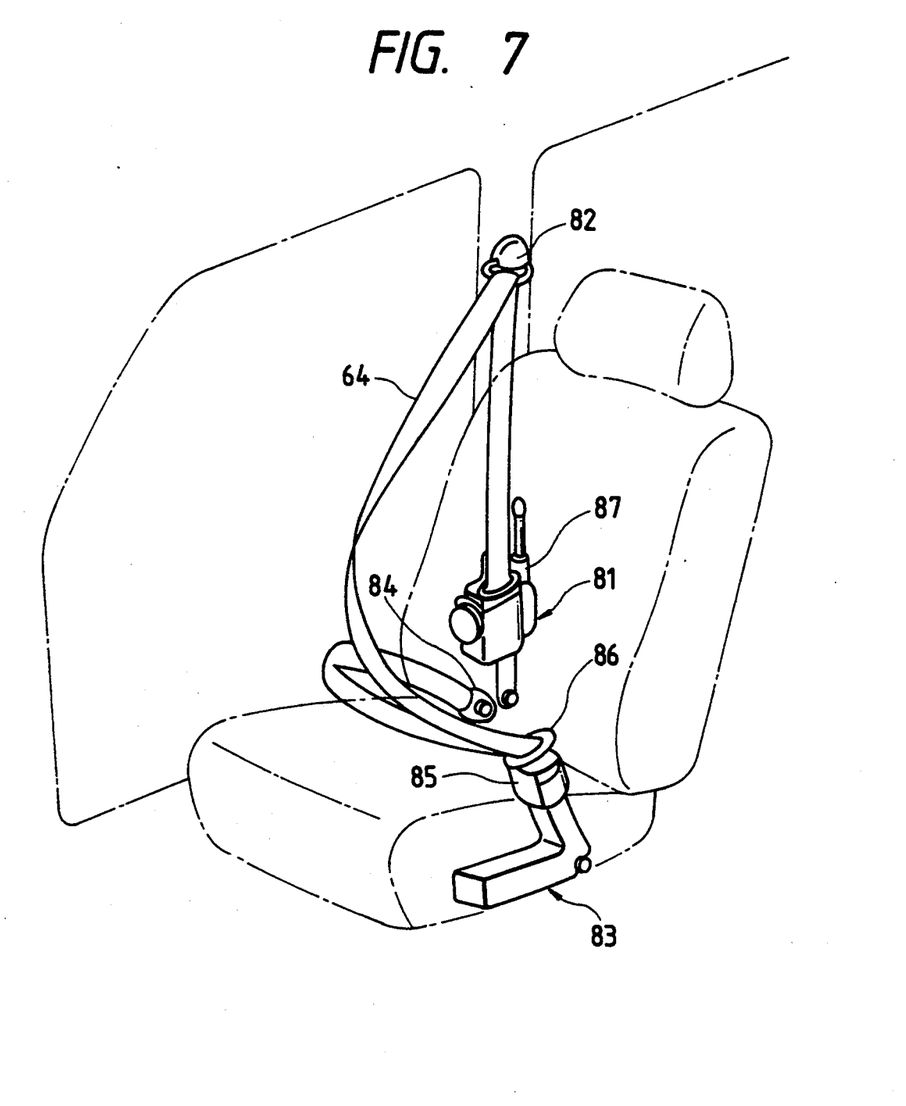
FIG. 7 is a perspective view of a seat belt apparatus constructed according to a fifth embodiment of the present invention.

A seat belt apparatus constructed according to a fifth embodiment of the present invention will be described below with reference to FIG. 7. The seat belt apparatus shown in FIG. 7 belongs to a so-called three point type seat belt apparatus. One end of a webbing 64 is connected to a seat belt retractor 81 having a pretensioner attached thereto, while other end of the same is connected via a through-anchor 82 to an anchor plate 84 disposed at the lower end part of a vehicle body. A passenger is restricted on a seat in the vehicle by connecting a through-tongue 86 disposed at the intermediate portion between the anchor plate 84 and the through-anchor 82 to a buckle 85 standing upright from the central part of the vehicle body. In this embodiment, by fitting a conventional mechanical type pretensioner 83 to the buckle 85 in addition to a pretensioner 87 for the retractor 81, the seat belt apparatus is constructed in such a manner as to include two pretensioners.

The pretensioner 87 for the retractor 81 belongs to a conventional pretensioner (please refer FIG. 9) which serves to retract a webbing 64 by instantaneously rotating a winding shaft of the retractor 81 when a magnitude of deceleration in excess of a predetermined one occurs with the vehicle for some reason. On the other hand, the mechanical type pretensioner 83 includes a weight adapted to move on an occurrence of acceleration due to shock or the like and a trigger unit for releasing the restorative resilient power of a compression spring, a leaf spring or the like held in the preliminarily biased state in operative association with the weight, and serves to eliminate the loosened state of the webbing 64 by instantaneously retracting the buckle 85 when a magnitude of deceleration in excess of a predetermined one occurs with the vehicle.

Figure 8:
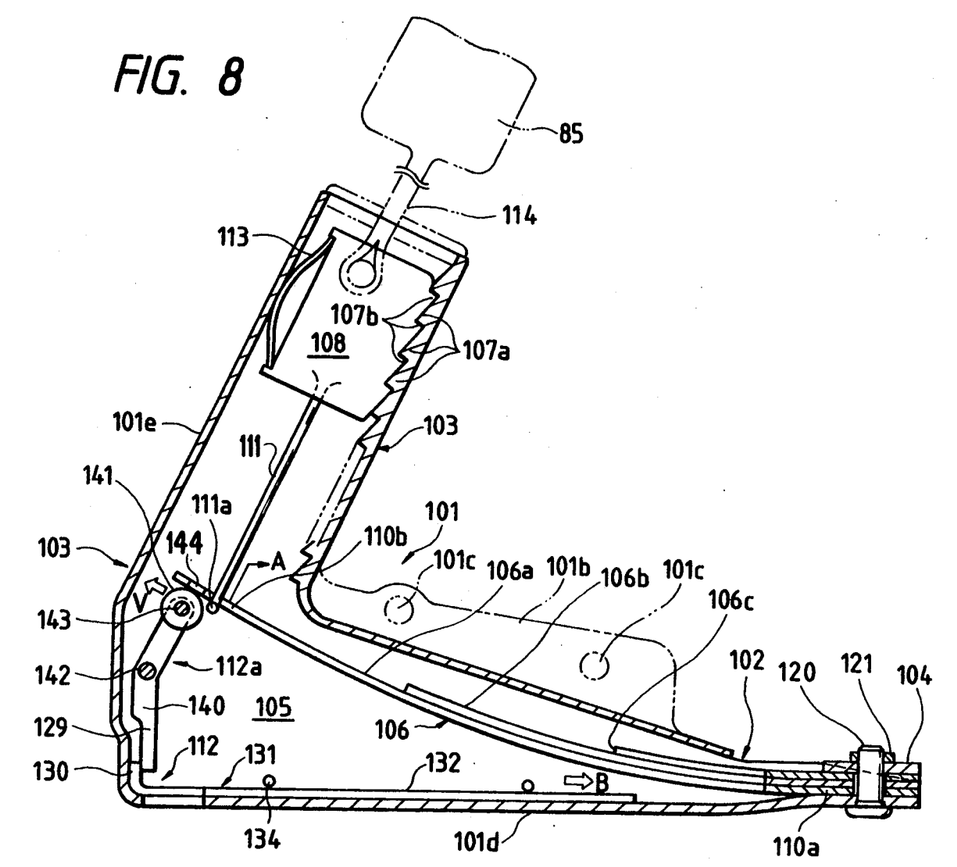
FIG. 8 is a vertical cross sectional view showing the mechanical type pretensioner shown in FIG. 7.

FIG. 8 shows a vertical cross sectional view of one example of the above-mentioned mechanical type pretensioner 83. A L-shaped housing 101 of the mechanical type pretensioner 83 has a hook shaped hollow body which is provided with a horizontal portion 102 extending a substantial horizontal direction and a vertical portion 103 extending in a upward direction relative to the horizontal portion 102 with an acute angle. The L-shaped housing 101 is fixedly mounted through a bolt member, as a part of vehicle body, to a rail portion mounted on the floor of the vehicle or a mounting surface upstanding relative to the floor thereof, through mounting holes 101c formed on a projecting portion 1b which is upwardly projected from the side wall 101a of the horizontal portion 102 of the housing 101.

A ratchet 107a is provided with pawls in the form of continuous sawtooth which are formed on the inner side wall of the vertical portion 103 and are linearly extended at predetermined intervals in the longitudinal direction of the vertical portion 103. A pawl block 108 is provided in the vertical portion 103. The pawl block 108 is provided with a ratchet 107b which is formed on the one side wall thereof and having pawls to be engaged with the pawls of the ratchet 107a. A leaf spring 113 is secured to the other side wall of the pawl block 108 which is opposed to the one side wall on which the ratchet 107b is provided. The pawl block 108 is biased by the leaf spring 113 with respect to a rear wall 101e of the vertical portion 103 in such a manner that the engagement state between the ratchet 107a and the ratchet 107b is maintained.

The pawls of the ratchet 107a and 107b are directed in such a manner that the pawl block 108 is only movable in a retracting direction of the vertical portion 103.

As shown in FIG. 8, in this embodiment, the leaf spring 106 is of a laminated spring type which is constructed by three plates. However, the leaf spring 106 of the three plates laminated spring type can be replaced with a leaf spring of a single leaf spring type in such a manner that a thickness and a width of the single leaf spring are designed so as to have a suitable function. The end portions 110a of the three plates 106a, 106b and 106c of the laminated leaf spring 106 are uniformly arranged and are secured by a nut 121 and a bolt 120 which penetrates the tip end 104 of the horizontal portion 102 of the L-shaped housing 101. The other end of each three plates 106a, 106b and 106c is made free. A practical free end of the leaf spring 106 is the free end of the longest plate 106a and is indicated at 110b, as shown in FIG. 8. A slot 144 is formed at the free end 110b.

A buckle 85 is substantially disposed on the vertical portion 103 for receiving and locking a metal fitting of the seat belt apparatus. A wire 114 extending from the buckle 85 is secured to the upper portion of the pawl block 108. One end of a cable 111 is secured to the lower portion of the pawl block 108, and the other end of the cable 111 is fixedly secured to the free end 110b of the leaf spring 106.

As shown in FIG. 8, a trigger apparatus 105 has a bent lever 140. The substantial center portion of the bent lever 140 is pivotally supported by a shaft 142 which is inwardly projected from a part of the housing 101, and the lower portion of the bent lever 140 is forked downwardly and is brought in contact with the upstanding projection 130 of the weight body 31. The upper portion of the bent lever 140 is inwardly extended from the end of the lower portion by slightly bending at the center portion. A roller 141 is rotatably mounted on the shaft 143 supported at the tip end of the upper portion of the bent lever 140, and is engaged with the slot 144 formed on the free end 110b of the leaf spring 106. In the case where the weight body 131 of the trigger apparatus 105 is subjected to an acceleration at the time of an occurrence of vehicle collision, the weight body 131 is moved in a B-direction and the roller 141 is moved in a V-direction toward the outside of the slot 144 so as to release the free end 110b of the leaf spring 106. Thereby, the buckle 85 is pulled by the leaf spring 106.

With this construction, when a very large magnitude of deceleration occurs with the vehicle at the time of an occurrence of emergency such as vehicle collision or the like, a collision sensor detects this deceleration and outputs a detection signal therebetween. In response to this detection signal, the pretensioner 87 is actuated, and at the same time, the mechanical type pretensioner 83 is also actuated because the weight moves to release the restorative resilient power derived from spring means such as a compression spring, a leaf spring or the like.

Since the retracting power of the seat belt apparatus is intensified when it is retractively driven by the retractor 81 and the mechanical type pretensioner 83 at the substantially same time, there is no need of increasing an intensity of driving power generated by each driving unit much more than that of the conventional seat belt apparatus. Thus, each passenger can intensely be retracted on his seat by intensifying the webbing tightening power without any increase of a quantity of explosive received in each driving unit as well as a spring constant of the spring means. Consequently, safety of each passenger at the time of an occurrence of emergency such as vehicle collision or the like can substantially be improved.

Similarly to the preceding embodiment, the time when the webbing 64 is retracted to generate the retracting power can properly be controlled by adequately delaying the ignition time of an explosive in the pretensioner 87 from the actuation time of the mechanical type pretensioner 83, whereby the webbing tightening properties of the seat belt apparatus can adequately be controlled.

Further, since the seat belt apparatus constructed according to this embodiment includes the pretensioner 87 for operatably rotating the winding shaft of the retractor in response to an electrical signal and the mechanical type pretensioner 83 for retractively driving the buckle, even in case that the pretensioner 87 can not be actuated due to an occurrence of abnormality in the electrical system, it is possible to actuate the pretensioner 83. On the contrary, even in case that the pretensioner 83 can not be actuated due to some mechanical abnormality, it is possible to actuate the pretensioner 87. For this reason, each passenger can reliably be restricted on his seat in the vehicle.

With the seat belt apparatus constructed according to the present invention, since the webbing tightening power can be intensified by simultaneously actuating a plurality of pretensioners without any necessity for increasing an intensity of driving power to be generated by a driving unit in each pretensioner, there is no need of intensifying the driving power of each driving unit, and moreover, there is no need of reinforcing components constituting the driving unit with certain additional means. Thus, each passenger can intensely be restricted on his seat in the vehicle by intensifying the webbing tightening power while suppressing increase of a production cost of the seat belt apparatus, whereby safety of each passenger at the time of an occurrence of vehicle collision can substantially be improved. In addition, since it is possible to properly control an intensity of webbing tightening power and a duration time of the tightened state by adequately controlling the actuation timing relationship among a plurality of pretensioners, acceptable webbing tightening performances can be obtained with the seat belt apparatus.

Conclusively, the present invention has provided a seat belt apparatus having high safety and excellent properties wherein it is possible to easily increase an intensity of webbing tightening power and a quantity of webbing tightening activity, and moreover, each passenger can reliably be restricted on his seat in the vehicle by employing a plurality of inexpensive pretensioners.

What is claimed is:

1. A seat belt tightening device comprising:
   a retractor base;
   a winding reel rotatably supported on said retractor base for freely winding and withdrawing a webbing thereabout;
   a cylinder;
   a piston slidably received in said cylinder;
   a driving force transmitting member having a first end connected with said piston and a second end opposed to said first end;
   at least two gas generators mounted on a base end side of said cylinder for driving said piston with an expansion of combustion gas generated in said gas generators;
   a coupling means for coupling said second end of said transmitting member with said winding reel when said gas generators are actuated, thereby said webbing is wound on said winding reel by rotating said winding reel being subjected to a driving force of said piston connected to said transmitting member which is coupled with said winding reel through said coupling means; and
   a cylindrical housing connected and communicated with said base end side of said cylinder, said cylindrical housing being extended in a direction perpendicular to a longitudinal direction of said cylinder, said gas generators being disposed at both ends of said cylindrical housing, respectively.

2. A seat belt tightening device according to claim 1, wherein each said gas generators includes an explosive, a heat generating element embedded in said explosive, and a signal line electrically connected to said heat generating element, wherein said heat generating elements of said gas generators are independently ignited.

3. A seat belt tightening device according to claim 2, wherein said heat generating elements of said gas generators are different from each other in an ignition time.

4. A seat belt tightening device according to claim 1, wherein one of said gas generators is constructed with an explosive, a heat generating element embedded in said explosive, and a signal line electrically connected to said heat generating element, and the other one of said gas generators is exploded by the function of shock and explosion pressure induced by said one of the gas generators.

5. A seat belt tightening device comprising:
   a retractor base;
   a winding reel rotatably supported on said retractor base for freely winding and withdrawing a webbing thereabout;
   a cylinder;
   a piston slidably received in said cylinder;
   a driving force transmitting member having a first end connected with said piston and a second end opposed to said first end;

at least two gas generators mounted on a base end side of said cylinder for driving said piston with an expansion of combustion gas generated in said gas generators;

a coupling means for coupling said second end of said transmitting member with said winding reel when said gas generators are actuated, thereby said webbing is wound on said winding reel by rotating said winding reel being subjected to a driving force of said piston connected to said transmitting member which is coupled with said winding reel through said coupling means; and a housing the upper opening portion of which is fixed to and is communicated with the base end of said cylinder, wherein said housing has at least two cylindrical insert portions which are inclined at a predetermined angle with respect to the longitudinal direction of said cylinder, and said gas generators are respectively mounted on the ends of said insert portions.

6. A seat belt tightening device according to claim 5, wherein said insert portions are extended in parallel with each other, and said insert portions are extended in a direction away from said base end of said cylinder.

7. A seat belt tightening device according to claim 6, wherein an ignition time of each of said gas generators is independently controlled so that one of said gas generators which is disposed at the furthest position from the base end of said cylinder is firstly ignited.

8. A seat belt tightening device according to claim 6, wherein said insert portions are arranged on a side of said cylinder.

* * * * *